Figure 1:
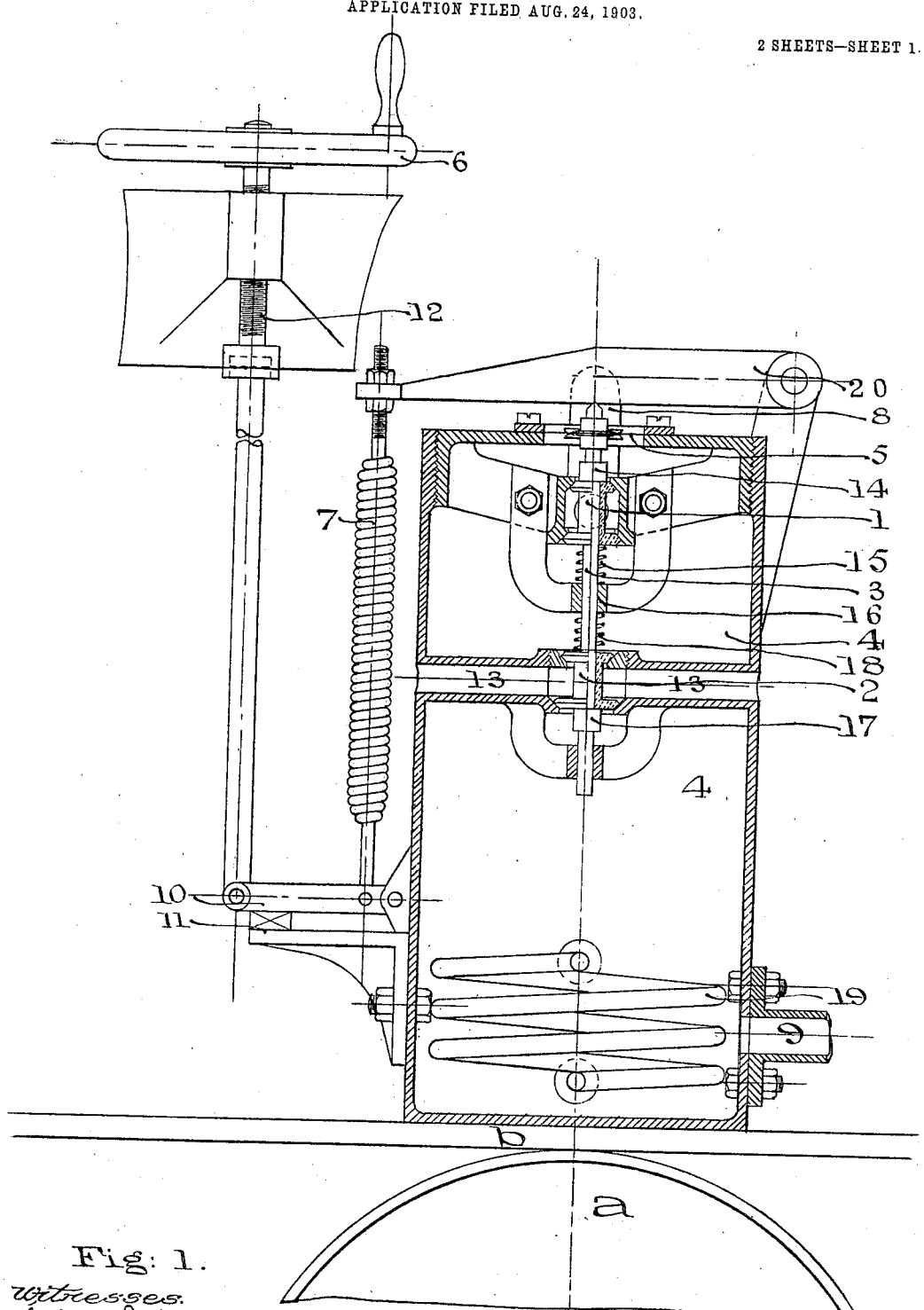

No. 821,759. PATENTED MAY 29, 1906.
W. R. SMITH.
DRIVER'S BRAKE VALVE FOR COMPRESSED AIR BRAKES.
APPLICATION FILED AUG. 24, 1903.

2 SHEETS—SHEET 1.

Witnesses.
G. Wm. Lutton
E. H. Allen.

Inventor:
William Rose Smith,
by Crosby Gregory att'ys.

No. 821,759.
PATENTED MAY 29, 1906.
W. R. SMITH.
DRIVER'S BRAKE VALVE FOR COMPRESSED AIR BRAKES.
APPLICATION FILED AUG. 24, 1903.
2 SHEETS—SHEET 2.
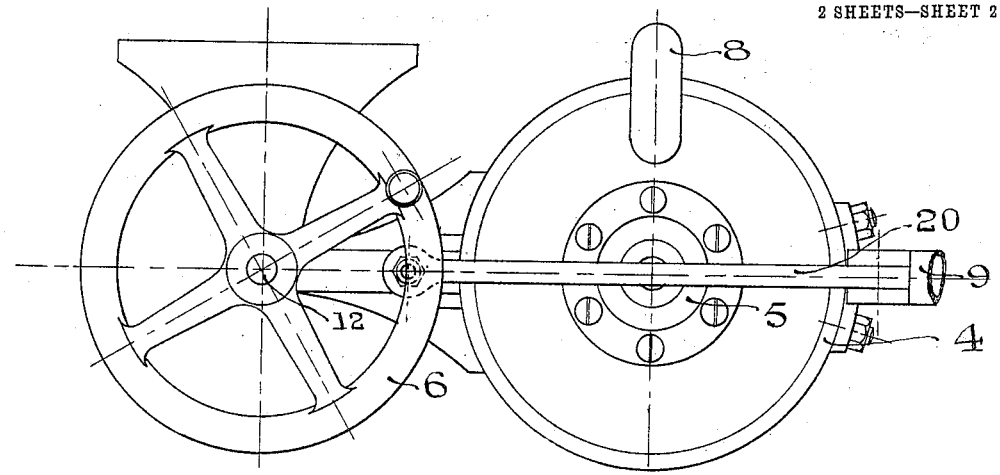
Fig: 2.
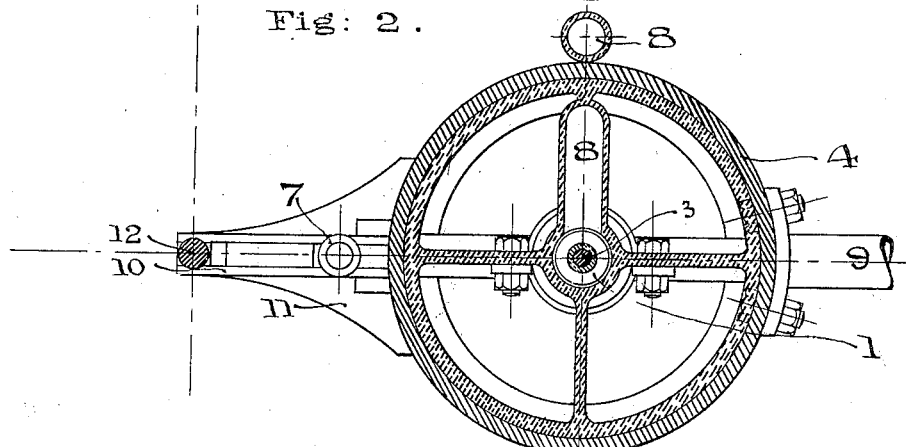
Fig: 3.
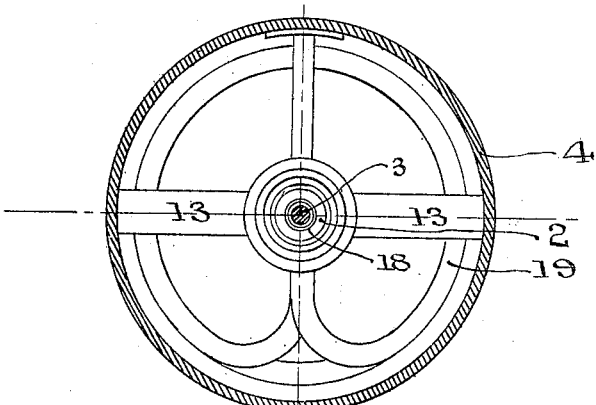
Fig: 4.
Witnesses.
J. Wm. Lutton.
E. H. Allen.
Inventor.
William Rose Smith
by Crosby Gregory
Attys.

UNITED STATES PATENT OFFICE.

WILLIAM ROSE SMITH, OF WEST NORWOOD, LONDON, ENGLAND, ASSIGNOR TO THOMAS HENRY PEARSE, OF LONDON, ENGLAND.

DRIVER'S BRAKE-VALVE FOR COMPRESSED-AIR BRAKES.

No. 821,759.　　Specification of Letters Patent.　　Patented May 29, 1906.

Application filed August 24, 1903. Serial No. 170,510.

*To all whom it may concern:*

Be it known that I, WILLIAM ROSE SMITH, a subject of the King of Great Britain, and a resident of West Norwood, London, S. E., England, have invented Improvements in Drivers' Brake-Valves for Compressed-Air Brakes, of which the following is a specification.

My invention relates to operating mechanism for compressed-air brakes for railway-trains and the like; and it includes means for causing the simultaneous operation of the brakes by preventing surging of the air or too sudden transmission of the reduced pressure to the brakes and usual auxiliary reservoirs, &c., forming the system and also includes means for preventing the sudden lowering of the temperature in the expansion-cylinder when the latter is receiving its primary charge.

I also provide an improved mechanism operating in connection with the driver's brake-handle or the operating mechanism in the engineer's cab.

All the various details of my invention and the advantages and operation thereof will be pointed out in the course of the following description, reference being had to the accompanying drawings, in which I have shown one embodiment of my invention.

In the drawings, Figure 1 is a view in vertical section, parts being broken away, showing a preferred embodiment of my invention. Fig. 2 is a top plan view thereof. Fig. 3 is a transverse sectional view taken through the reducing-valve, Fig. 1; and Fig. 4 is a similar transverse sectional view taken immediately over the atmospheric valve, Fig. 1.

I have not deemed it necessary to show or indicate the entire system, but have confined myself to those features which constitute the present embodiment of my invention, although it will be understood that I do not intend to limit my invention thereto, inasmuch as it is capable of various embodiments, including wide changes in constructional details, without departing from the spirit and scope of my invention.

The compressed air is stored at a high pressure in a main reservoir $a$ under the foot-plate $b$ of the locomotive. From this the air is led by a pressure-main 8 to the reducing-valve 1 in an isothermal expansion-chest 4, within which the two double-beat valves 1 and 2 are placed, moving on a spindle 3. The upper valve 1 is a double-beat reducing-valve opening downward, operating in connection with a diaphragm 5, lever 20, and main spring 7, and serves to admit the compressed air from the main reservoir $a$ at varying high pressure—say from sixty to two hundred pounds—into the expansion-chest 4, train-pipe 9, and auxiliary reservoirs on each carriage at the constant pressure regulated by the main spring 7—say about sixty pounds on the square inch. The lower end of the spring 7 is fastened to a hinged lever 10 on the expansion-chest casing, and the lever 10 is pressed down against a fixed stop 11 to stretch the spring 7 to the required tension by the screw-rod 12 and handle 6 of the driver's brake-valve.

The lower or atmospheric valve 2 is a double-beat exhaust-valve opening upward to lead the air from the expansion-chest 4 to the atmosphere through pipes 13. Both valves are automatically worked by the diaphragm 5 moving the valve-spindle 3 upward or downward, according to the pressure in the expansion-chest 4 being normal—that is, sixty pounds—or less as regulated by the driver's brake-wheel handle 6 and 12 being screwed down hard on the stop 11 or unscrewed to relax the spring 7. The reducing-valve 1 is opened by a stop 14, fastened on the valve-spindle 3 immediately over the valve 1 and closed by a spiral spring 15, pressing on its lower end and butting on the upper valve-spindle guide 16 or the top of the lower or atmospheric valve 2. The atmospheric valve 2 is opened by a stop 17, fastened on the valve-spindle 3 immediately under the valve 2 and closed by a spiral spring 18, pressing on its upper end and butting on the upper valve-spindle guide 16 or the bottom of the reducing-valve 1. A steam-coil of copper piping 19 may be inserted in the bottom of the expansion-chest 4 for isothermal expansion of the compressed air. The double-beat valves 1 and 2 may be replaced alternatively by two plug-valves or by two Peat's sluice-valves, all other parts of the apparatus remaining practically the same as above described.

The manner of working the improved driver's brake-valve is as follows: Immediately on the main reservoir $a$ being charged with compressed air over sixty pounds pressure, the driver's brake-handle 6 and 12 being screwed down hard on the stop 11, the expansion-chest 4, train-pipe 9, and the auxiliary reservoirs attached to each carriage are charged automatically through the upper or reducing valve 1 with air at sixty pounds pressure, and the brakes, if on, are released. On the driver unscrewing the brake-handle 6 and 12 the tension of the main spring 7 is relaxed, lowering the pressure of the air in the expansion-chest 4 to a corresponding degree by the normal pressure (sixty pounds) in the expansion-chest pressing the diaphragm 5 and valve-spindle 3 upward, when the stop 17 on the valve-spindle under the atmospheric valve 2 opens the valve, which allows a portion of the air to escape from the expansion-chest 4 and train-pipe 9 to the atmosphere. The lowering of the pressure in the train-pipe works the triple valve by closing the brake-cylinder valve to admit pressure from the auxiliary reservoir to the brake-cylinder, applying the brakes with a degree of pressure regulated with perfect delicacy by the extent to which the driver unscrews the brake-handle. During the upward movement of the diaphragm and spindle of the driver's brake-valve the upper or reducing valve 1 is kept firmly closed by the spring 15, pressing on the lower end of the valve, and the spring 18, pressing on the upper end of the lower or atmospheric valve, closes it automatically immediately on the descent of the diaphragm to the horizontal. The opening of the atmospheric valve 2 within the expansion-chest 4 in a large volume of air causes the pressure of the air to be lowered in the train-pipe along the whole length without surging, so that all the brakes are actuated simultaneously. The heating-coil in the expansion-chest is heated by steam from the boiler on the primary charging of the train-pipe and auxiliary reservoirs to prevent sudden lowering of the temperature by the expansion of a large volume of compressed air.

Having thus described my invention, what I claim as new, and desire to secure by Letters Patent, is—

1. In compressed-air brakes, a driver's brake-valve, consisting of two double-beat or other suitable valves moving on one spindle within an expansion-chest, both valves worked by up-and-down movements of a diaphragm under the variation of pressure of the compressed air within the expansion-chest, as regulated by the driver's brake-handle controlling the tension on the main spring of the diaphragm as above described.

2. In compressed-air brakes, the combination of the driver's brake-handle with a pair of levers, spring, and stop; to regulate the admission of compressed air to the expansion-chest, train-pipe, and auxiliary reservoirs when the brake-handle is screwed hard down on the stop, and the lowering of the pressure in the expansion-chest and train-pipe to put on the brakes when the brake-handle is unscrewed and the main spring relaxed as above described.

3. In compressed-air brakes, an improved isothermal reducing-valve, combined with the driver's brake-valve consisting of a balanced double-beat valve worked by a diaphragm and spring for reducing the pressure of the compressed air from that contained in the main reservoir to the pressure required in the main pipe and restoring the heat required for isothermal expansion by a hot-water or steam circulating coil in an expansion-chest, as above described.

4. In a compressed-air brake apparatus, a main reservoir for compressed air, an expansion-chest adapted to be connected thereto, and heating means for the latter for preventing sudden lowering of the temperature by the expansion due to the admission of a large volume of compressed air from said reservoir into said chest.

5. In a compressed-air brake apparatus, a main reservoir for compressed air, an expansion-chest adapted to be connected thereto, and a heater contained within said chest for preventing sudden lowering of the temperature by the expansion due to the admission of a large volume of compressed air from said reservoir into said chest.

6. In a compressed-air brake apparatus, a source of compressed-air supply liable to be charged at varying pressures, an expansion-chest, reducing means provided for automatically admitting to said chest a predetermined pressure of air from said supply, and a heating-coil of steam-pipe within said chest for effecting isothermal expansion therein.

7. In a compressed-air brake apparatus, a train-pipe for the pneumatic operation of a series of brakes, a source of compressed-air supply, means for transmitting said compressed air to said pipe, including an expansion-chest, an atmospheric valve opening out of said chest, the said chest having large capacity whereby the reaction caused by the escaping of air at said valve operates on the large volume of air within said chest to reduce without surging and simultaneously, the pressure along the whole length of said pipe.

8. In a compressed-air brake apparatus, an expansion-chest, a flexible diaphragm therein, a fixed valve-seat, said valve having a valve-stem secured to said diaphragm, a lever pivoted adjacent said diaphragm to coöperate with said stem, a spring for regulating the pressure of said lever, and means for adjusting the tension of said spring.

9. In a compressed-air brake apparatus, an expansion-chest, a diaphragm therein, a valve controlled by the movements of said diaphragm, a lever mounted adjacent said diaphragm for transmitting pressure thereto, a driver's brake-handle, a pivoted lever connected therewith, and a pressure-spring connecting said two levers for regulating the pressure on said diaphragm.

10. In a compressed-air brake apparatus, an expansion-chest, a flexible diaphragm at one end thereof, a valve for said chest, having its stem secured to said diaphragm, a lever pivoted across the outer end of said chest to coöperate with said stem, and an adjustable spring connected to the free end of said lever for governing the pressure thereof on said valve.

11. In a compressed-air brake apparatus, an expansion-chest, a reducing-valve therefor, an atmospheric valve, a stem for operating both of said valves, and a flexible diaphragm to which said stem is secured.

12. In a compressed-air brake apparatus, an expansion-chest, a reducing-valve therefor, an atmospheric valve, a stem for operating both of said valves, and a flexible diaphragm to which said stem is secured, said atmospheric valve having a limited sliding movement on said stem.

13. In a compressed-air brake apparatus, an expansion-chest, a reducing-valve therefor, an atmospheric valve, a stem for operating both of said valves, and a flexible diaphragm to which said stem is secured, said reducing-valve having a limited sliding movement on said stem.

14. In a compressed-air brake apparatus, an expansion-chest, a reducing-valve therefor, an atmospheric valve, a stem for operating both of said valves, and a flexible diaphragm to which said stem is secured, said two valves being slidingly mounted on said stem, and the latter carrying stops operating respectively on the opposite sides of said respective valves, whereby movement of said stem in one direction causes a stop to engage one of said valves and movement in the opposite direction causes the other stop to engage the other of said valves.

15. In a compressed-air brake apparatus, an expansion-chest, a reducing-valve for controlling the admission of air to said chest, and an air-passage in said valve, means to operate said valve, a pipe extending transversely of said chest through the body thereof, a valve for opening and closing said pipe to the interior of said chest, and means for operating said latter valve.

In witness whereof I have hereunto set my hand in presence of two witnesses.

WILLIAM ROSE SMITH.

Witnesses:
  A. NUTTING,
  FREDK. L. RAND.